(12) United States Patent
Choi et al.

(10) Patent No.: US 9,988,725 B2
(45) Date of Patent: Jun. 5, 2018

(54) ELECTRONIC DEVICE HAVING METAL HOUSING AND METHOD FOR MANUFACTURING THE SAME (71) Applicant: Samsung Electronics Co., Ltd., Gyeonggi-do (KR)

(72) Inventors: Jongmin Choi, Seongnam-si (KR); Jaeseon Kim, Suwon-si (KR); Donghyun Hwang, Hwaseong-si (KR); Woongchan Kim, Suwon-si (KR); Youngsik Choi, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 8 days.

(21) Appl. No.: 15/186,314

(22) Filed: Jun. 17, 2016

(65) Prior Publication Data
US 2017/0013735 A1 Jan. 12, 2017

(30) Foreign Application Priority Data

Jul. 9, 2015 (KR) .................. 10-2015-0097778

(51) Int. Cl.
C23F 4/00 (2006.01)
G06F 1/16 (2006.01)
H04B 1/3888 (2015.01)
C25D 11/02 (2006.01)
C25D 11/24 (2006.01)
(Continued)

(52) U.S. Cl.
CPC .............. *C23F 4/00* (2013.01); *C25D 11/022* (2013.01); *C25D 11/12* (2013.01); *C25D 11/16* (2013.01); *C25D 11/243* (2013.01); *C25D 11/246* (2013.01); *G06F 1/16* (2013.01); *G06F 1/1626* (2013.01); *H04B 1/3888* (2013.01); *H04M 1/0202* (2013.01)

(58) Field of Classification Search
CPC ........... C23F 4/00; C25D 11/16; C25D 11/12; C25D 11/243; C25D 11/246; C25D 11/022; G06F 1/16; G06F 1/1626; H04B 1/3888; H04M 1/0202
See application file for complete search history.

(56) References Cited

U.S. PATENT DOCUMENTS 8,024,016 B2 * 9/2011 Lim .................... H04M 1/0283
455/575.4
9,143,586 B2 * 9/2015 Allore ................... H04M 1/185
(Continued)

FOREIGN PATENT DOCUMENTS

KR 10-2014-010140 8/2014

*Primary Examiner* — Jinhee Lee
*Assistant Examiner* — Abhishek Rathod (57) ABSTRACT An electronic device having a metal housing includes an external housing including a first face facing a first direction, a second face facing a second direction which is the opposite direction of the first direction, and a lateral face at least partially surrounding a space formed between the first and second faces, and a display exposed through the first face of the external housing, wherein the external housing includes a metal substrate having a first part at least partially forming the second face and a second part at least partially forming the lateral face, the second part being integrally extended from the first part; and a non-metallic material coated on the first part, and wherein the second part includes micro dimples having a repeated pattern on the lateral face.

12 Claims, 10 Drawing Sheets (51) Int. Cl.
*C25D 11/12* (2006.01)
*C25D 11/16* (2006.01)
*H04M 1/02* (2006.01)

(56) References Cited

U.S. PATENT DOCUMENTS

| | | | |
|---|---|---|---|
| 9,337,543 B2* | 5/2016 | Jung | H01Q 1/243 |
| 9,464,360 B2* | 10/2016 | Chung | G06F 1/1656 |
| 9,509,813 B2* | 11/2016 | Chung | H04M 1/0249 |
| 9,699,926 B2* | 7/2017 | Hwang | H05K 5/0243 |
| 2008/0165485 A1* | 7/2008 | Zadesky | H04M 1/0252 |
| | | | 361/679.02 |
| 2008/0280083 A1* | 11/2008 | Qiu | C25D 3/12 |
| | | | 428/35.8 |
| 2009/0323292 A1* | 12/2009 | Hwang | G06F 1/1615 |
| | | | 361/730 |
| 2011/0017602 A1* | 1/2011 | Khosla | C25D 5/02 |
| | | | 205/50 |
| 2011/0020613 A1* | 1/2011 | Kim | B05D 5/068 |
| | | | 428/187 |
| 2013/0099637 A1* | 4/2013 | Richardson | H04M 1/18 |
| | | | 312/223.1 |
| 2014/0228080 A1 | 8/2014 | Choi et al. | |
| 2014/0243053 A1* | 8/2014 | Hynecek | A45C 11/00 |
| | | | 455/575.8 |
| 2014/0268525 A1* | 9/2014 | Hwang | B29C 45/0053 |
| | | | 361/679.01 |
| 2014/0284071 A1* | 9/2014 | Tao | H05K 9/0067 |
| | | | 174/50 |
| 2015/0286256 A1* | 10/2015 | Delano | G06F 1/203 |
| | | | 361/679.26 |
| 2016/0224075 A1* | 8/2016 | Chen | G06F 1/1656 |

* cited by examiner

ELECTRONIC DEVICE HAVING METAL HOUSING AND METHOD FOR MANUFACTURING THE SAME

CROSS-REFERENCE TO RELATED APPLICATION AND CLAIM OF PRIORITY

The present application is related to and claims benefit under 35 U.S.C. § 119(a) of Korean patent application filed on Jul. 9, 2015 in the Korean Intellectual Property Office and assigned Serial number 10-2015-0097778, the entire disclosure of which is hereby incorporated by reference.

TECHNICAL FIELD

Embodiments of the present disclosure relate to an electronic device having a metal housing and a method for manufacturing the electronic device.

BACKGROUND

Normally an electronic device has an antenna for wireless communication. Recently such an antenna is embedded in the electronic device so as to realize an elegant and size-reduced electronic device.

Meanwhile, a housing of the electronic device is often manufactured with metal. While this metal housing has advantages of improving an outward appearance and enhancing a stiffness, it causes degradation in performance of an embedded antenna. In order to obviate this problem, such a metal housing itself is also used as an antenna.

Typically, a metal housing is manufactured through a casting, a computerized numerical control (CNC), an extruded molding, a rolling, a forging, etc., and also improves antenna performance through an injection so as to prevent degradation of antenna performance due to metal residing on a rear face thereof. However, in this case, a boundary produced between a metal part and an injection part on the metal housing is not smart and appears as a segmented form. Therefore, in order to secure the uniformity in the metal part and the injection part, a process of coating the entire rear face may be applied or the injection part may be exposed.

In case of coating the metal housing to secure the uniformity in the metal part and the injection part, several colors may be used for the metal housing through partial coating or printing with partial masking. However, such a coating on the metal housing may remove the intrinsic texture of metal and also make it difficult to differentiate the metal part from the injection part. Alternatively, in case of fitting any additional member formed of glass, metal, etc. so as to conceal a boundary between the metal part and the injection part, the thickness of the housing may be increased and an undesirable bonding issue may be caused.

SUMMARY

To address the above-discussed deficiencies, it is a primary object to provide an electronic device having a metal housing and a manufacturing method thereof may be provided to improve an outward appearance by realizing two colored textures of the metal housing.

According to various embodiments of the present disclosure, an electronic device having a metal housing and a manufacturing method thereof may be provided to effectively secure the uniformity of an injection part formed by an insert injection and attached to a metal part on a rear face of the metal housing.

According to various embodiments of the present disclosure, an electronic device having a metal housing and a manufacturing method thereof may be provided not to need any additional masking process for realizing various colors and textures.

In accordance with an aspect of the present disclosure, an electronic device comprises: an external housing including a first face facing a first direction, a second face facing a second direction which is the opposite direction of the first direction, and a lateral face at least partially surrounding a space formed between the first and second faces; and a display exposed through the first face of the external housing, wherein the external housing includes: a metal substrate having a first part at least partially forming the second face and a second part at least partially forming the lateral face, the second part being integrally extended from the first part; and a non-metallic material coated on the first part, and wherein the second part includes micro dimples having a repeated pattern on the lateral face.

In accordance with another aspect of the present disclosure, a method for manufacturing an electronic device having a metal housing comprises: a forming operation for an external housing; and a lateral processing operation for the external housing, wherein the forming operation for the external housing includes: a base metal preparation operation for preparing a base metal of the external housing; a first processing operation performed with respect to the prepared base metal of the external housing; an insert injection operation for attaching an injection part to the first-processed base metal; a second processing operation for forming an outward part of the external housing with respect to the base metal having the injection part; a coating operation for coating a non-metallic material on a surface of the base metal having the outward part; and a third processing operation for forming a lateral face of the external housing by removing a peripheral part of the base metal from the outward part, and wherein the lateral processing operation for the external housing includes: an anodizing operation for forming an anodized surface on the lateral side of the external housing; and a diamond cutting operation for forming a diamond-cut face with respect to a boundary between the anodized surface and the coated surface of the external housing.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged display device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those or ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used in embodiments of the present disclosure, the expression "include" or "may include" or "can include" refers to the existence of a corresponding function, operation, or constituent element, and does not limit one or more additional functions, operations, or constituent elements. Further, as used in embodiments of the present disclosure, the term, such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

As used in embodiments of the present disclosure, the expression "and/or" includes any or all combinations of words enumerated together. For example, the expression "A or B" or "at least one of A and B" may include A, may include B, or may include both A and B.

While expressions including ordinal numbers, such as "first" and "second", as used in embodiments of the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

Figure 1:
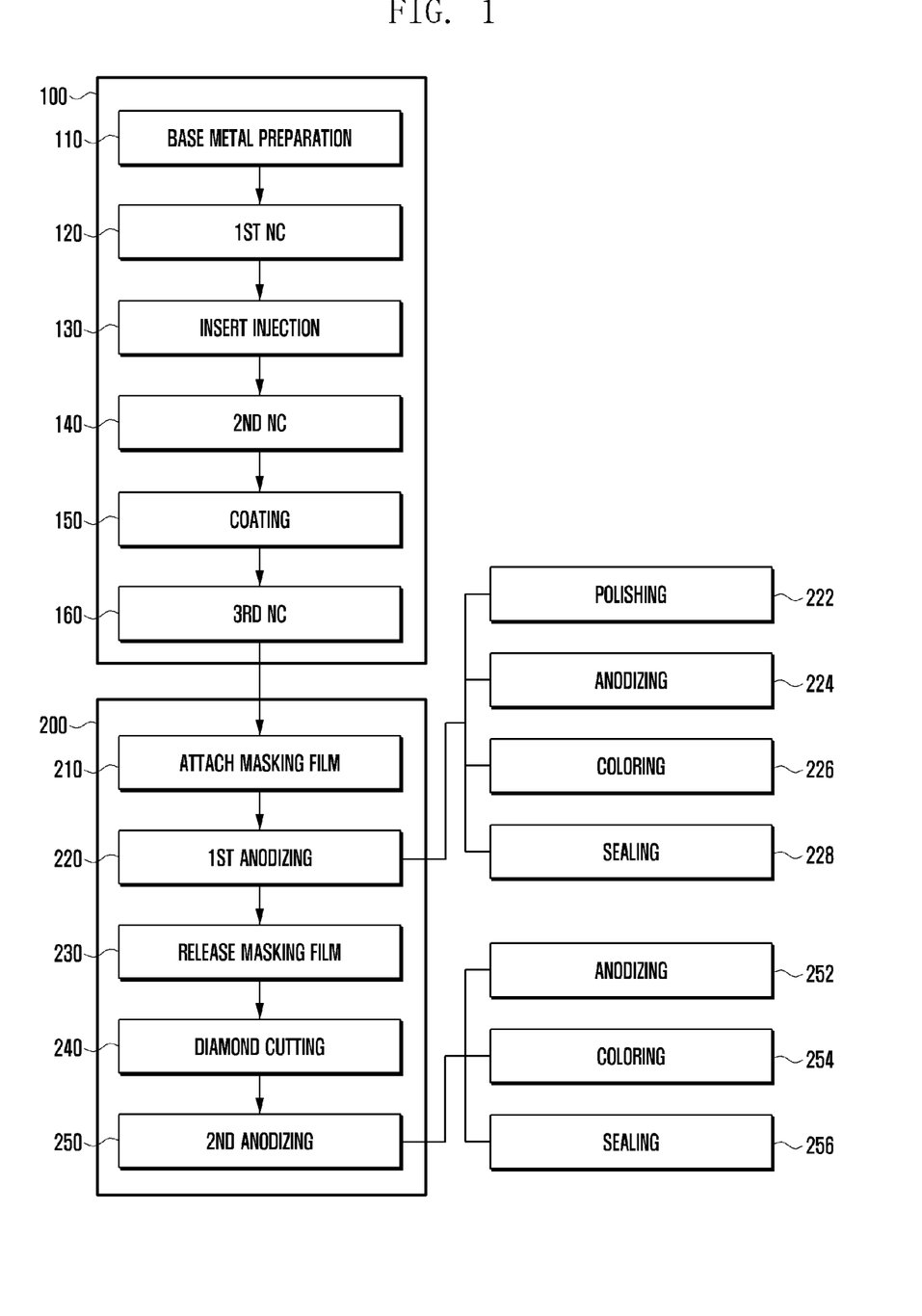
FIG. 1 is a flow diagram illustrating a method for manufacturing a metal housing of an electronic device according to an embodiment of the present disclosure.

FIG. 1 is a flow diagram illustrating a method for manufacturing a metal housing of an electronic device according to an embodiment of the present disclosure.

As shown in FIG. 1, the method for manufacturing the metal housing of the electronic device according to various embodiments can include mainly a forming operation 100 for forming an external housing and a lateral processing operation 200 for the external housing.

The forming operation 100 for the external housing can include a base metal preparation operation 110 for preparing a base metal of the external housing, a first processing operation 120 performed with respect to the prepared base metal of the external housing, an insert injection operation 130 for attaching an injection part to the first-processed base metal, a second processing operation 140 for forming an outward part of the external housing with respect to the base metal having the injection part, a coating operation 150 for coating a non-metallic material on a surface of the base metal having the outward part, and a third processing operation 160 for forming a lateral face of the external housing by removing a peripheral part of the base metal from the outward part.

Additionally, the lateral processing operation 200 for the external housing can include a first anodizing operation 220 for forming an anodized surface on the lateral side of the external housing, and a diamond cutting operation 240 for forming a diamond-cut face with respect to a boundary between the anodized surface and the coated surface of the external housing.

The lateral processing operation 200 for the external housing can further include an operation 210 of attaching a masking film before the first anodizing operation 220, and an operation 230 of releasing the masking film after the first anodizing operation 220.

Also, the lateral processing operation 200 for the external housing can further include a second anodizing operation 250 after the diamond cutting operation 240.

According to various embodiments, processing operations performed for the external housing of the electronic device can be classified into the first, second and third processing operations, each of which can include a numerical control (NC) processing operation. Sometimes, any other well-known processing can be further used.

Figure 2:
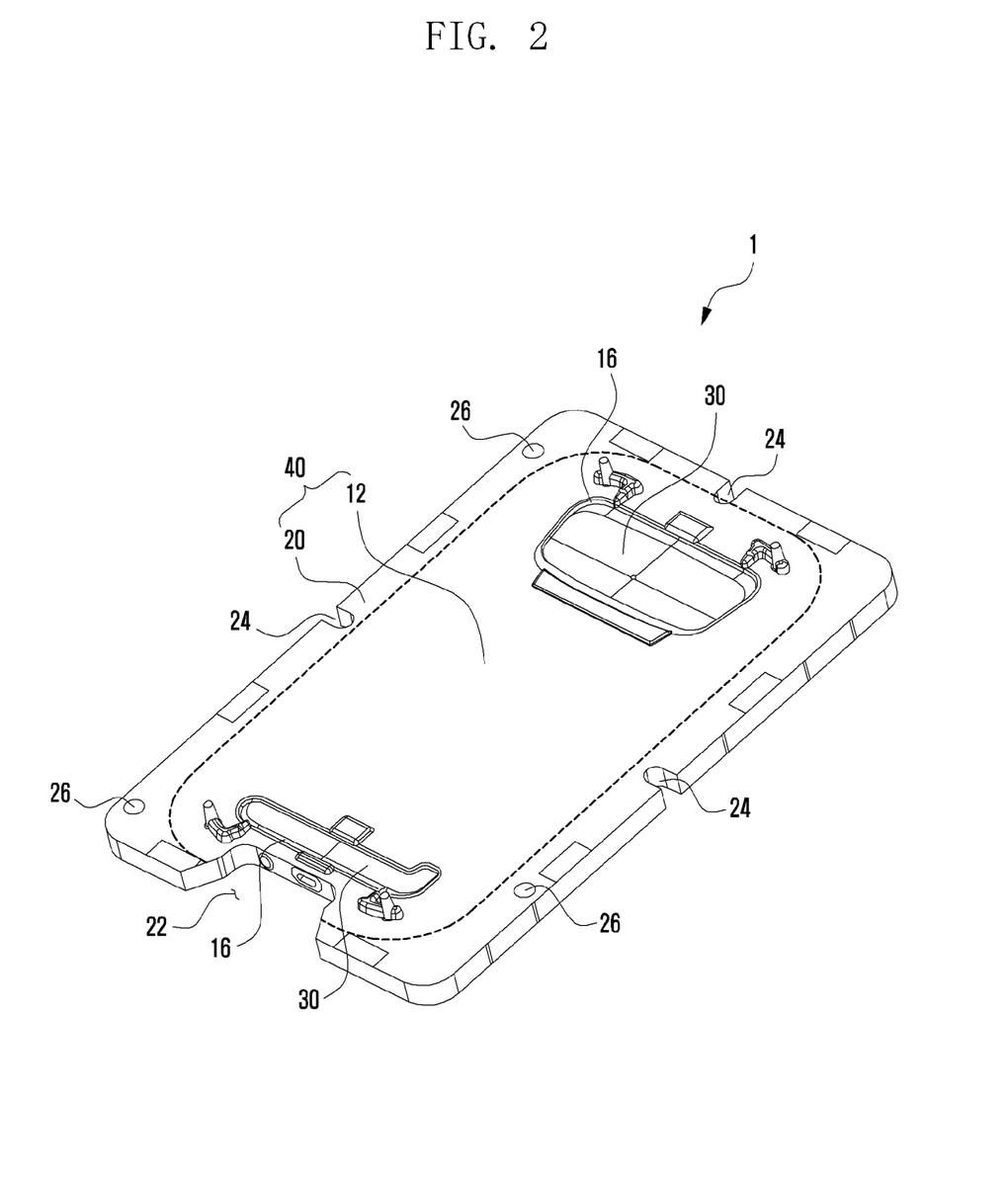
FIG. 2 is a perspective view illustrating a base metal for forming an external housing of an electronic device according to various embodiments of the present disclosure.

FIG. 2 is a perspective view illustrating a base metal for forming an external housing of an electronic device according to various embodiments of the present disclosure.

Referring to FIGS. 1 and 2, the electronic device according to various embodiments of this disclosure can include an external housing formed by processing a base metal 1, such as aluminum, through a casting, a computerized numerical control (CNC), an extruded molding, a rolling, a forging, etc., and also include a display exposed through one face of the external housing. For example, the aluminum base metal 1 of the external housing can have a shape as shown in FIG. 2 through a first NC processing (e.g., operation 120) and an insert injection (e.g., operation 130).

The external housing formed of the base metal 1 can include a first face facing a first direction, a second face facing a second direction which is the opposite direction of the first direction, and a lateral face at least partially surrounding the first and second faces. According to an embodiment, the display (2 shown in FIG. 5) can be exposed through the first face.

In various embodiments, the external housing formed of the base metal 1 can include a metal substrate having a first part 12 at least partially forming the second face and a second part 20 at least partially forming the lateral face.

The second part 20 can be integrally extended from the first part 12.

Additionally, the external housing can further include a non-metallic material coated on the first part 12. The second part 20 can include micro dimples having a repeated pattern formed on the lateral face by cutting.

According to an embodiment, the metal substrate can further have a third part extended between the first and second parts 12 and 20, and the third part can be exposed to the outside.

The external housing can further include other non-metallic material coated on the third part of the metal substrate.

The first part 12 can have an opening part 16 which is formed at the center of the aluminum base metal 1 so as to allow an injection part 30 to be attached. The first and second parts 12 and 20 can be integrated with each other to form the second face, i.e., a rear face 40, facing the second direction.

Depending on a desired shape of the electronic device, the aluminum base metal 1 can further have a recess part 22 and a plurality of punching grooves 24 formed through the first NC processing (operation 120), and can also have a plurality of guide holes 26 and binding holes (28 shown in FIG. 3) to be used for molding equipment or the like. The recess part 22, the punching grooves 24, the guide holes 26 and the binding holes 28 can be disposed in the second part 20 adjacent to the edge of the aluminum base metal 1.

The injection part 30 is formed to improve antenna performance and attached to the opening part 16 of the aluminum base metal 1 through an insert injection. The injection part 30 can use, as material thereof, engineering plastic suitable for an anodizing processing to be described later. For example, heat-resistant and acid-resistant polymer resin such as Poly-Butylene-Terephtalate (PBT) or PolyPhenylene Sulfide (PPS) can be used.

Figure 3:
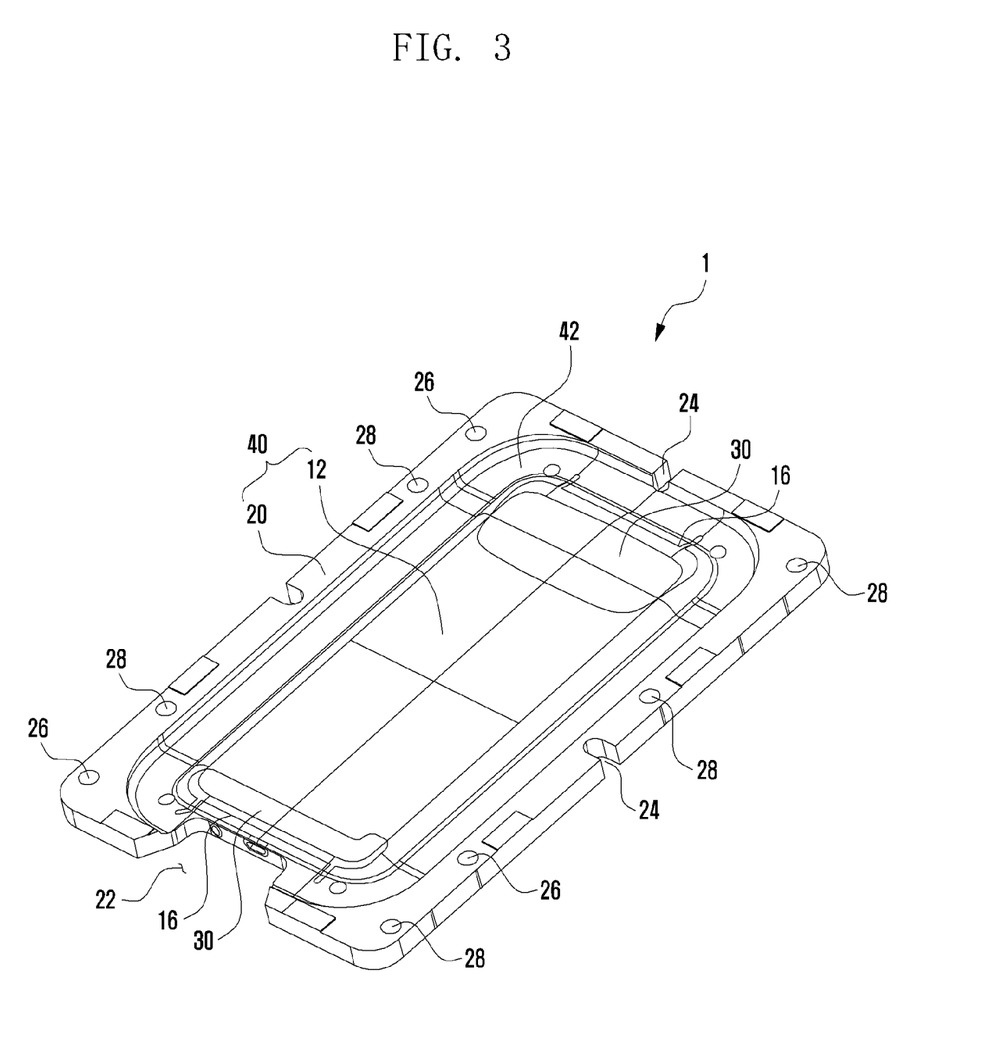
FIG. 3 is a perspective view illustrating a rear processing of a base metal for forming an external housing of an electronic device according to various embodiments of the present disclosure.

FIG. 3 is a perspective view illustrating a rear processing of a base metal for forming an external housing of an electronic device according to various embodiments of the present disclosure.

Referring to FIGS. 1 to 3, the aluminum base metal 1 forming the external housing of the electronic device can be subjected to the second NC processing (e.g., operation 140) for the rear face 40 thereof. According to an embodiment, the first part 12 (i.e., inside a dotted line in FIG. 2) of the aluminum base metal 1 can be hollowed out through the second NC processing so as to obtain a desired design. Therefore, through the second NC processing, the electronic device can have a desired outward design based on an outward part 42 of the external housing.

Figure 4:
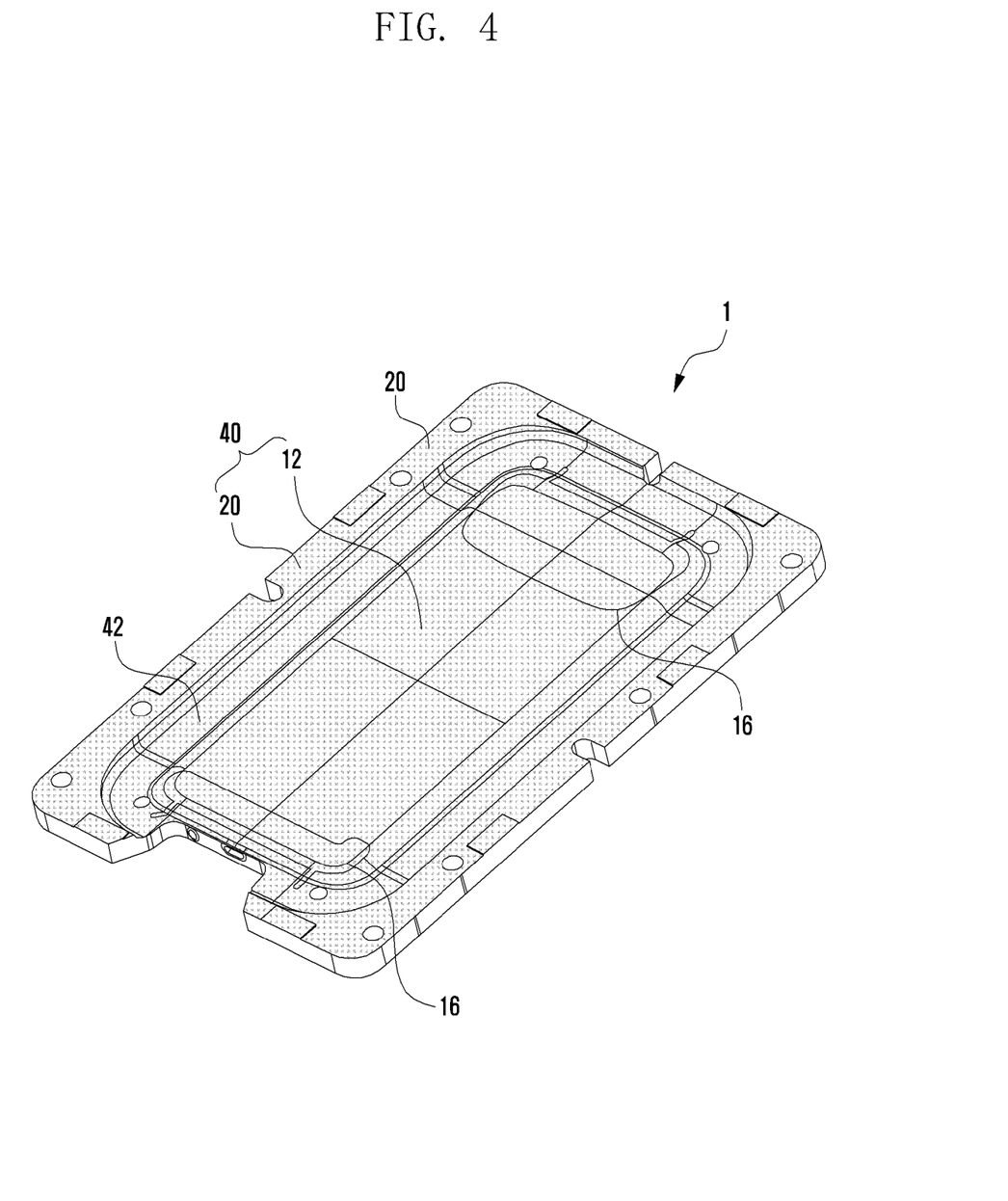
FIG. 4 is a perspective view illustrating a state where a non-metallic material is coated on an outward part of an external housing of an electronic device according to various embodiments of the present disclosure.

FIG. 4 is a perspective view illustrating a state where a non-metallic material is coated on an outward part of an external housing of an electronic device according to various embodiments of the present disclosure.

Referring to FIGS. 1 and 4, the aluminum base metal 1 that forms the external housing of the electronic device can have a non-metallic material coated on at least parts of the rear face 40 having the outward part 42. The coating of the non-metallic material can be applied to secure the uniformity in the metal part and the injection part 30 since the injection part 30 is attached to the opening part 16 of the base metal 1 through an insert injection. According to various embodiments, a coating material can have a heat-resistant and acid-resistant ingredient and do not cause a change in color, quality, texture, etc. even in an anodizing processing to be discussed later.

Figure 5:
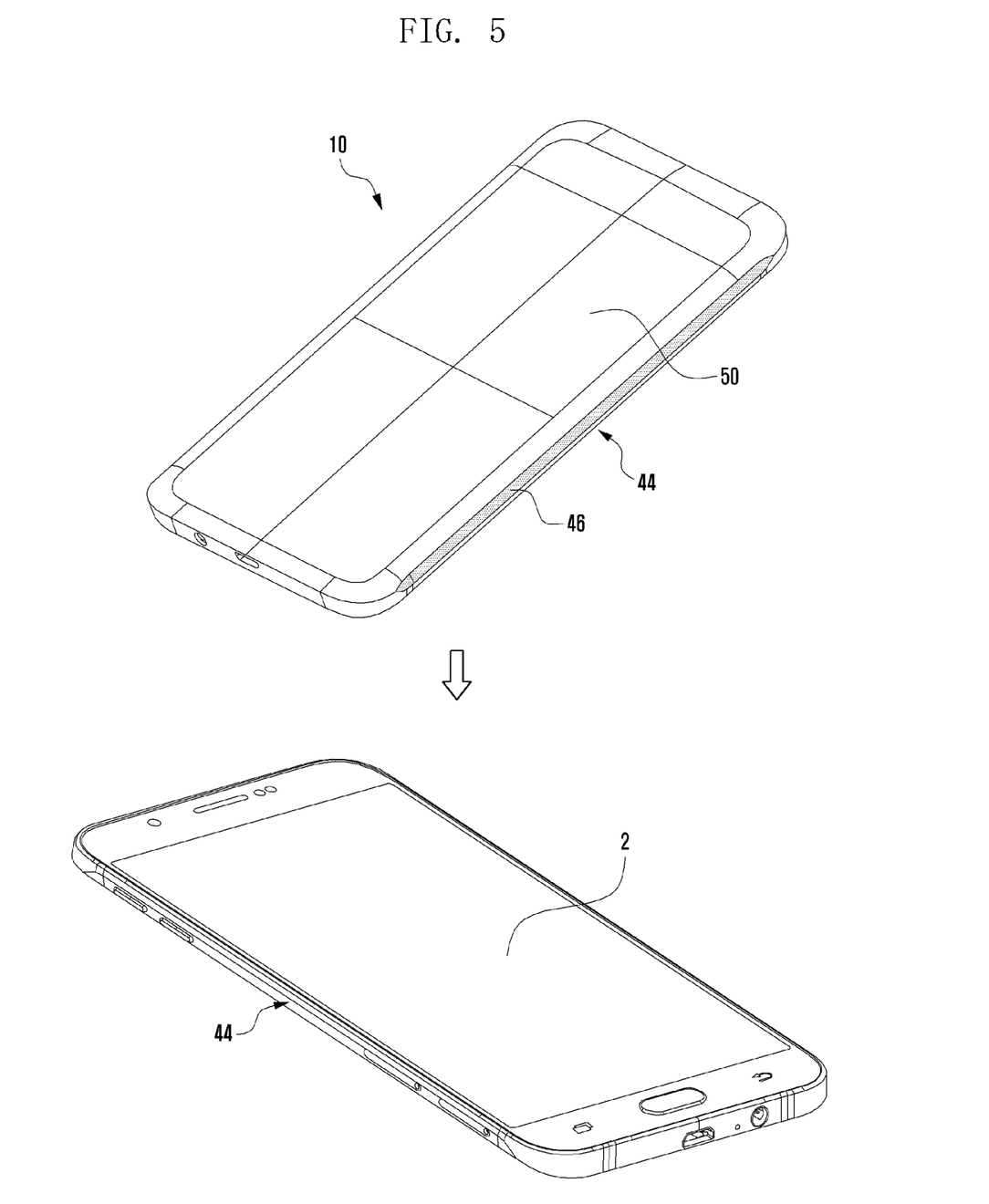
FIG. 5 is a perspective view illustrating a rear face and a front face of an external housing of an electronic device according to various embodiments of the present disclosure.

FIG. 5 is a perspective view illustrating a rear face and a front face of an external housing of an electronic device according to various embodiments of the present disclosure.

Referring to FIGS. 1 and 5, the external housing 10 of the electronic device can have a coated surface 50 formed of the non-metallic material coated on at least parts of the rear face 40 having the outward part 42 of the aluminum base metal 1. According to an embodiment, after a coating material is coated on at least parts of the rear face 40 to form the coated surface 50, cutting of the third NC processing (e.g., operation 160) can be performed for the second part 20 adjacent to the edge of the aluminum base metal 1 so as to remove the outside of the outward part 42 and thereby obtain the lateral face 44 of the external housing 10.

The non-metallic material coated for the coated surface 50 in the coating operation 150 according to various embodiments can use a heat-resistant and acid-resistant coating material which at least partially prevents oxygen or water penetration into the micro dimples 46 having the repeated pattern formed on the lateral face 44 and is thereby unaffected by anodizing.

On coating conditions according to various embodiments, a top coat can be formed through a bake-type coating with urethane-cure type coating material or UV-cure type coating material or any material for forming a coated layer in all ranges of realizing a curing reaction. Further, various-colored 2-component UV-cure type printing can be applied on such a top coat.

A middle color coat can use vinyl resin, acrylic lacquer, or acrylic polyol for securing adhesiveness with a bottom primer coat, and can use a coating material containing organic/inorganic pigment for realizing the sense of particle, color, brightness, etc., organic dyes, silver, pearl, and the like.

A bottom primer coat can use vinyl resin, acrylic lacquer, or acrylic polyol for securing adhesiveness with a putty which can use a coating material containing resin of epoxy melamine, polyester polyol, or acrylic polyol, and extender such as talc, matting agent, and the like.

A primer material can use vinyl resin, acrylic lacquer, or acrylic polyol for securing adhesiveness with both metal material (AL6013) and PBT material containing 40% of glass fiber (GF).

Figure 6:
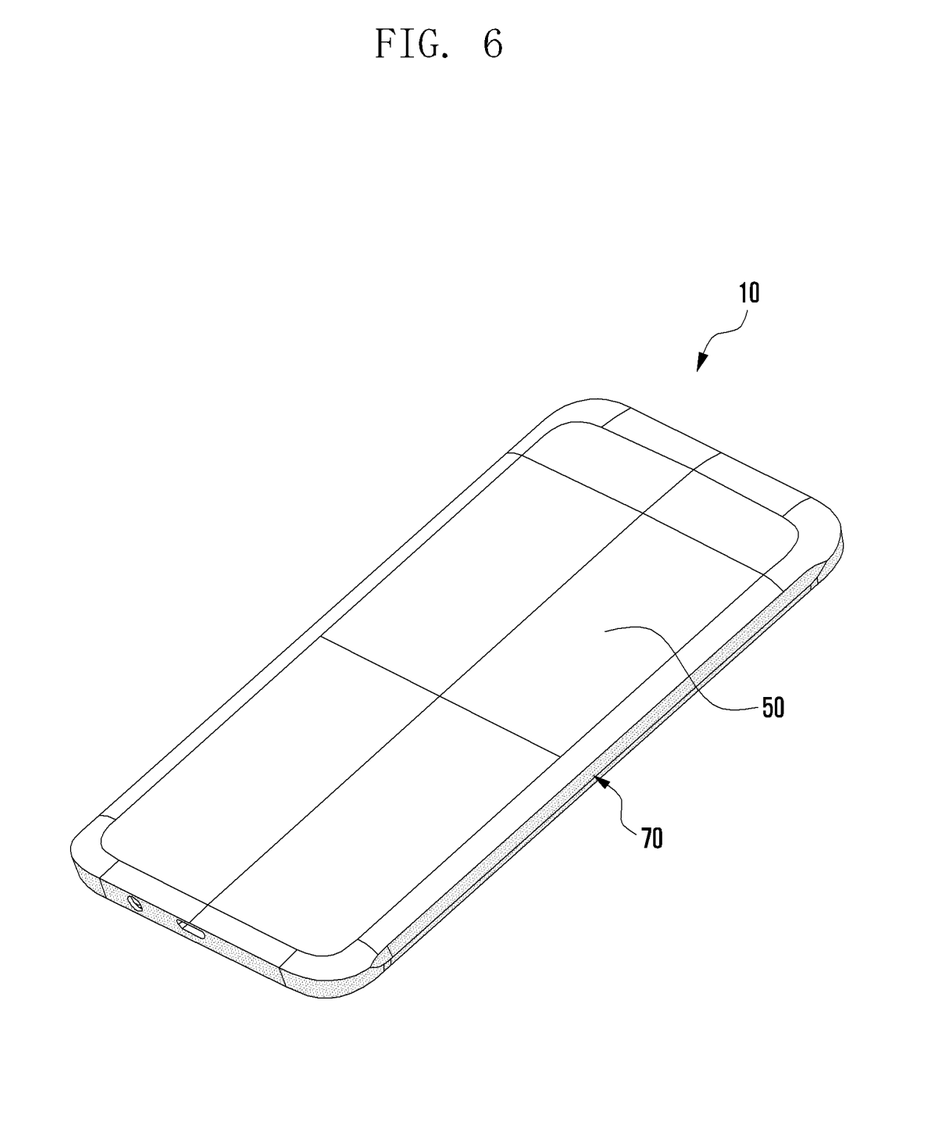
FIG. 6 is a perspective view illustrating an external housing of an electronic device after an anodizing processing on a lateral face according to various embodiments of the present disclosure.
Figure 7:
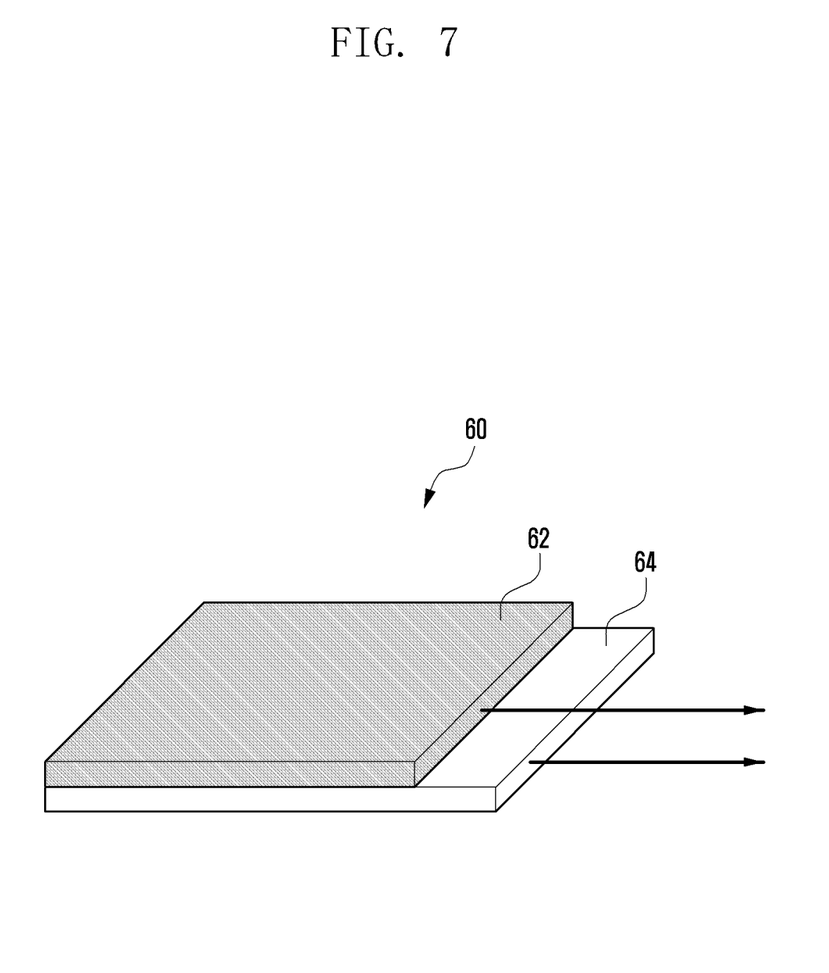
FIG. 7 is a perspective view illustrating a masking film according to various embodiments of the present disclosure.

Meanwhile, FIG. 6 is a perspective view illustrating an external housing of an electronic device after an anodizing processing on a lateral face according to various embodiments of the present disclosure. FIG. 7 is a perspective view illustrating a masking film according to various embodiments of the present disclosure.

Referring to FIGS. 1,6 and 7, the first anodizing (operation 220) can include polishing (operation 222) performed on the lateral face 44 of the external housing 10, and the first anodizing processing (operation 224) to form micro dimples in a repeated pattern on the lateral face 44.

Further, a coloring (operation 226) can be performed on such micro dimples formed in a repeated pattern on the lateral face 44, and then a sealing (operation 228) of the colored micro dimples can be performed. Therefore, as shown in FIG. 6, an anodized surface 70 can be formed on the lateral face 44 of the external housing 10.

According to various embodiments, a non-metallic coating material used for the coated surface 50 of the aluminum base metal 1 can fail to have a heat-resistant and acid-resistant property. In this case, a masking film 60 can be attached to the coated surface 50 as an acid resistance masking tape before the anodizing (operation 200), and can be removed after the anodizing (operation 200).

For example, the masking film 60 can use a masking tape formed of a heat-resistant and acid-resistant film, such as polyethylene terephthalate (PET) or polyimide (PI), and a silicone or acryl type adhesive. In an embodiment, as shown in FIG. 7, the masking film 60 is a PET film of 60~80 μm coated with a silicone adhesive and can be formed of a silicone adhesive 62 of 35~55 μm and a PET film 64 of about 25 μm. Since a polishing in anodizing is performed at a temperature of 98° C., a PET material having a heat resistance of 150° C., a PI material having a heat resistance of 250° C., or any other material having a greater heat resistance can be used.

Additionally, in addition to a silicone type adhesive, an acryl type adhesive having adhesion of 500 gf/in or more can be used even though causing adhesive swelling after anodizing.

According to an embodiment, an anodized surface 70 is formed to have a random circular shape by anodizing processing. In this case, the anodized surface 70 can have a diameter of 20~30 nm and a depth (i.e., the thickness of a film) of 3~6 μm.

The polishing (operation 222) of the first anodizing (operation 220) is an electroless process. Since the texture and gloss of the anodized surface 70 are determined depending on conditions, a polishing temperature can be adjusted from 70° C. to 120° C. and also a polishing time can be adjusted from 5 seconds to 1 minute.

Figure 8:
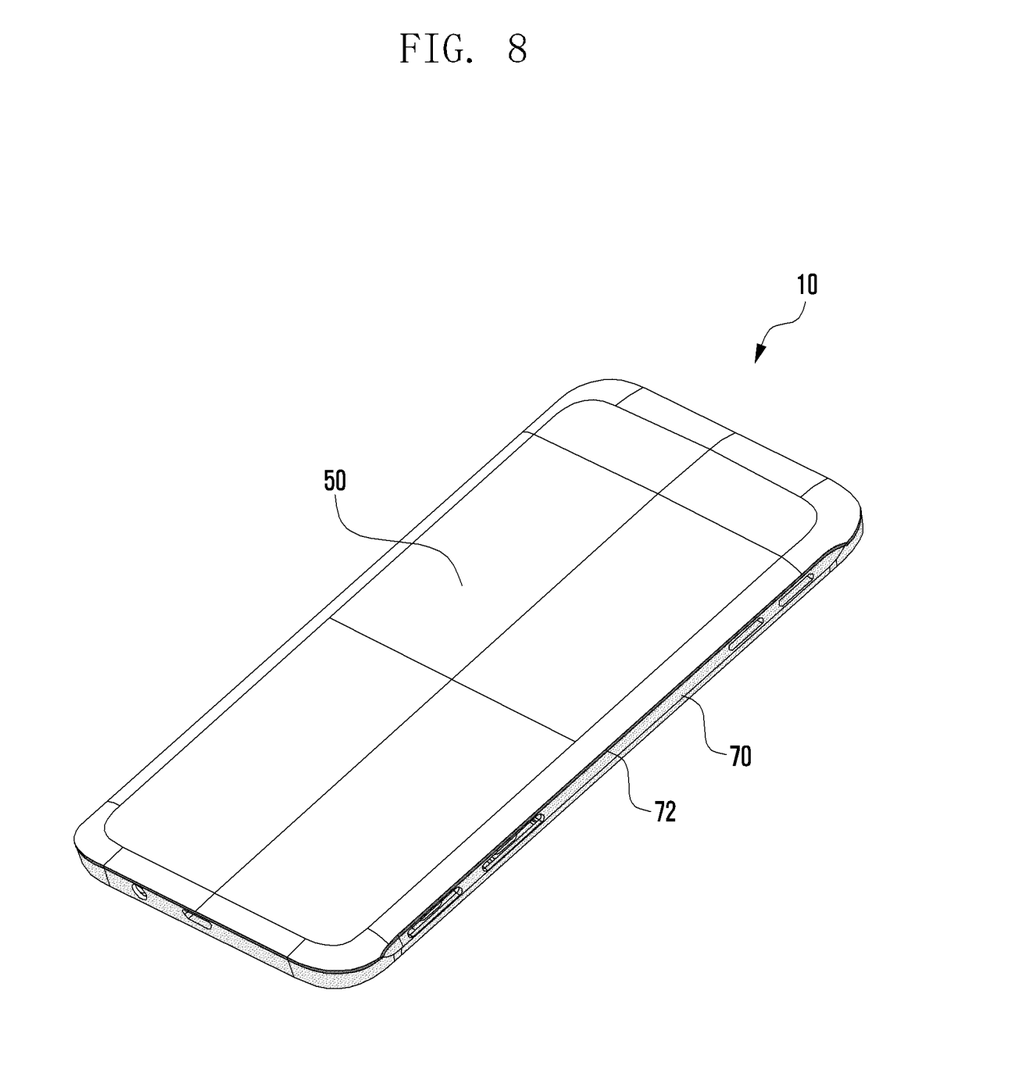
FIG. 8 is a perspective view illustrating an external housing of an electronic device after a diamond cutting process for a boundary between an anodized surface and a coated surface according to various embodiments of the present disclosure.
Figure 9:
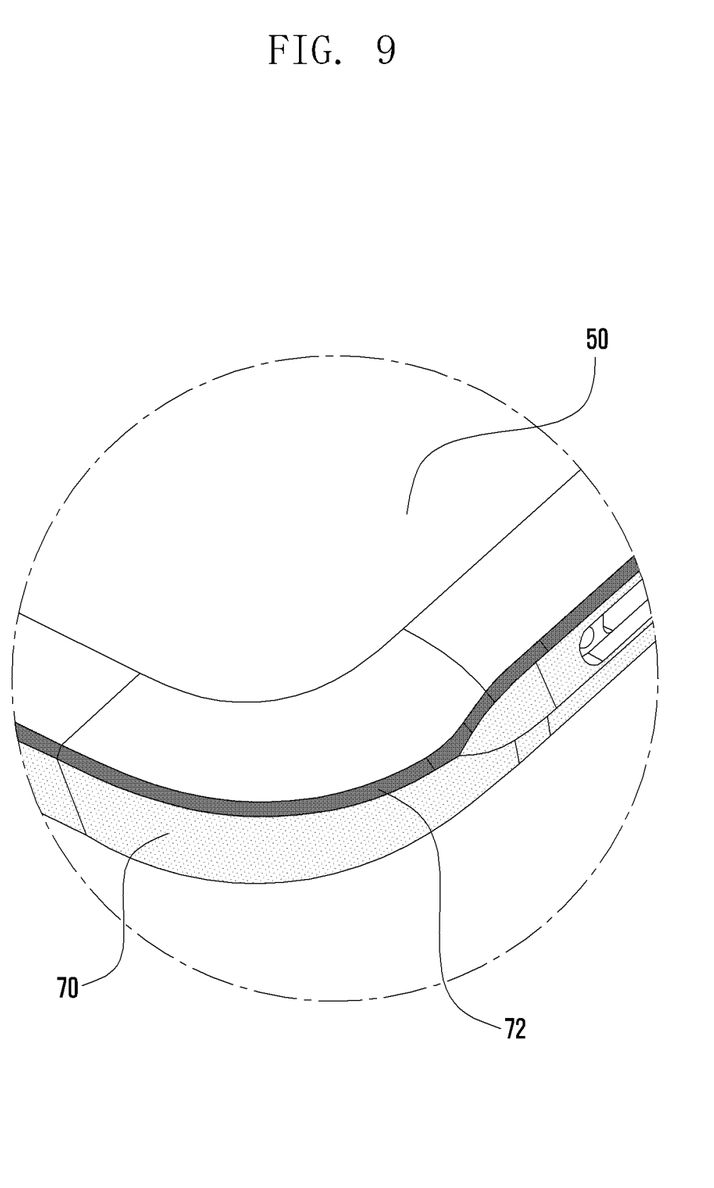
FIG. 9 is a partially enlarged perspective view illustrating a lateral corner of an external housing of an electronic device according to an embodiment of the present disclosure.

FIG. 8 is a perspective view illustrating an external housing of an electronic device after a diamond cutting process for a boundary between an anodized surface and a coated surface according to various embodiments of the present disclosure. FIG. 9 is a partially enlarged perspective view illustrating a lateral corner of an external housing of an electronic device according to an embodiment of the present disclosure.

Referring to FIGS. 1, 8 and 9, the external housing 10 according to various embodiments can include a diamond cut face 72 formed by applying a diamond cutting process to a boundary between the anodized surface 70 and the coated surface 50.

According to various embodiments, the diamond cut face 72 added to the external housing 10 of the electronic device can realize two colored textures of the external housing 10 and thereby improve an outward appearance. Also, a diamond cutting can maximize texture and property peculiar to metal and hence realize a luxurious image.

According to various embodiments, the external housing of the electronic device can further undergo the second anodizing (operation 250).

Contrary to the first anodizing (operation 220), the second anodizing (operation 250) has a direct anodizing (operation 252) for the anodized surface 70 without polishing. Therefore, micro dimples 46 are formed in the repeated pattern on the anodized surface 70. Additionally, a coloring (operation 254) can be performed on the micro dimples 46 and then a sealing (operation 256) of the colored micro dimples 46 can be performed.

Since the second anodizing (operation 250) is performed in different anodizing conditions from the first anodizing (operation 220) without polishing (operation 222), there is no effect on the anodized surface 50. Therefore, there is need to attach a masking film before the second anodizing (operation 250).

The electronic device according to various embodiments of this disclosure can include the external housing 10 including a first face facing a first direction, a second face facing a second direction which is the opposite direction of the first direction, and a lateral face 44 at least partially surrounding a space formed between the first and second faces, and can also include the display 2 exposed through the first face of the external housing 10.

The external housing 10 can include a metal substrate having a first part 12 at least partially forming the second face, and a second part 20 at least partially forming the lateral face 44. The second part 20 can be integrally extended from the first part 12. The external housing 10 can further include a non-metallic material coated on the first part 12, and the second part 20 can include micro dimples 46 having a repeated pattern on the lateral face 44.

The metal substrate can further have a third part extended between the first and second parts 12 and 20. The third part is exposed to the outside.

Also, the metal substrate can further have a third part extended between the first and second parts 12 and 20, and the external housing 10 can further include other non-metallic material coated on the third part of the metal substrate.

The first part 12 can have an injection part 30 formed of a heat-resistant and acid-resistant material of engineering plastic by an insert injection. The heat-resistant and acid-resistant material can be Poly-Butylene-Terephtalate (PBT) or PolyPhenylene Sulfide (PPS).

The lateral face 44 can have an anodized surface 70 formed by an anodizing process. The micro dimples 46 can be formed in the repeated pattern on the anodized surface 70.

The non-metallic material coated on the first part can have a heat-resistant and acid-resistant ingredient which at least partially prevents oxygen or water penetration into the micro dimples having the repeated pattern formed on the lateral face 44 of the external housing 10 and is thereby unaffected by anodizing.

The non-metallic material can undergo a curing reaction by a bake-type coating at a top coat, have adhesiveness between a middle color coat and a bottom primer coat and between the bottom primer coat and a putty, and uses primer material having adhesiveness with both metal material (AL6013) and PBT material containing 40% of glass fiber.

The anodized surface 70 can have a diameter of 20~30 nm and a depth or thickness of 3~6 μm.

The external housing 10 can further include a diamond-cut face 72 formed applying a diamond cutting process to a boundary between the anodized surface 70 and the first part 12.

The micro dimples 46 can be formed in the repeated pattern on the anodized surface 70 through a second anodizing process performed on the anodized surface 70 after formation of the diamond-cut face 72.

An electronic device according to various embodiments of the present disclosure can be a device including a projection or a communication function. For example, the electronic device can be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device can be a smart home appliance having a projection function. The smart home appliance can include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device can include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device can include at least one of furniture or a part of a building/structure, an electronic board, an electronic signature receiving device, a projector, and various types of measuring devices (for example, a water meter, an electricity meter, a gas meter, a radio wave meter and the like) including a projection function. The electronic device according to various embodiments of the present disclosure can be one or a combination of the above described various devices. Further, the electronic device according to various embodiments of the present disclosure can be a flexible device. It is apparent to those skilled in the art that the electronic device according to various embodiments of the present disclosure is not limited to the above described devices.

The exemplary embodiments disclosed in the specification and drawings are merely presented to easily describe technical contents of the present disclosure and help the understanding of the present disclosure and are not intended to limit the scope of the present disclosure. Therefore, all changes or modifications derived from the technical idea of the present disclosure as well as the embodiments described herein should be interpreted to belong the scope of the present disclosure.

The electronic device having the metal housing according to various embodiments of this disclosure can include a short range communication module for short range communication. As short range communication technique, Bluetooth, radio frequency identification (RFID), infrared data association (IrDA), ultra wideband (UWB), ZigBee, near field communication (NFC), or the like can be used. The coated surface 50 formed on the rear face 40 of the external housing 10 can use a coating material which does not disturb the radiation of an antenna.

Figure 10:
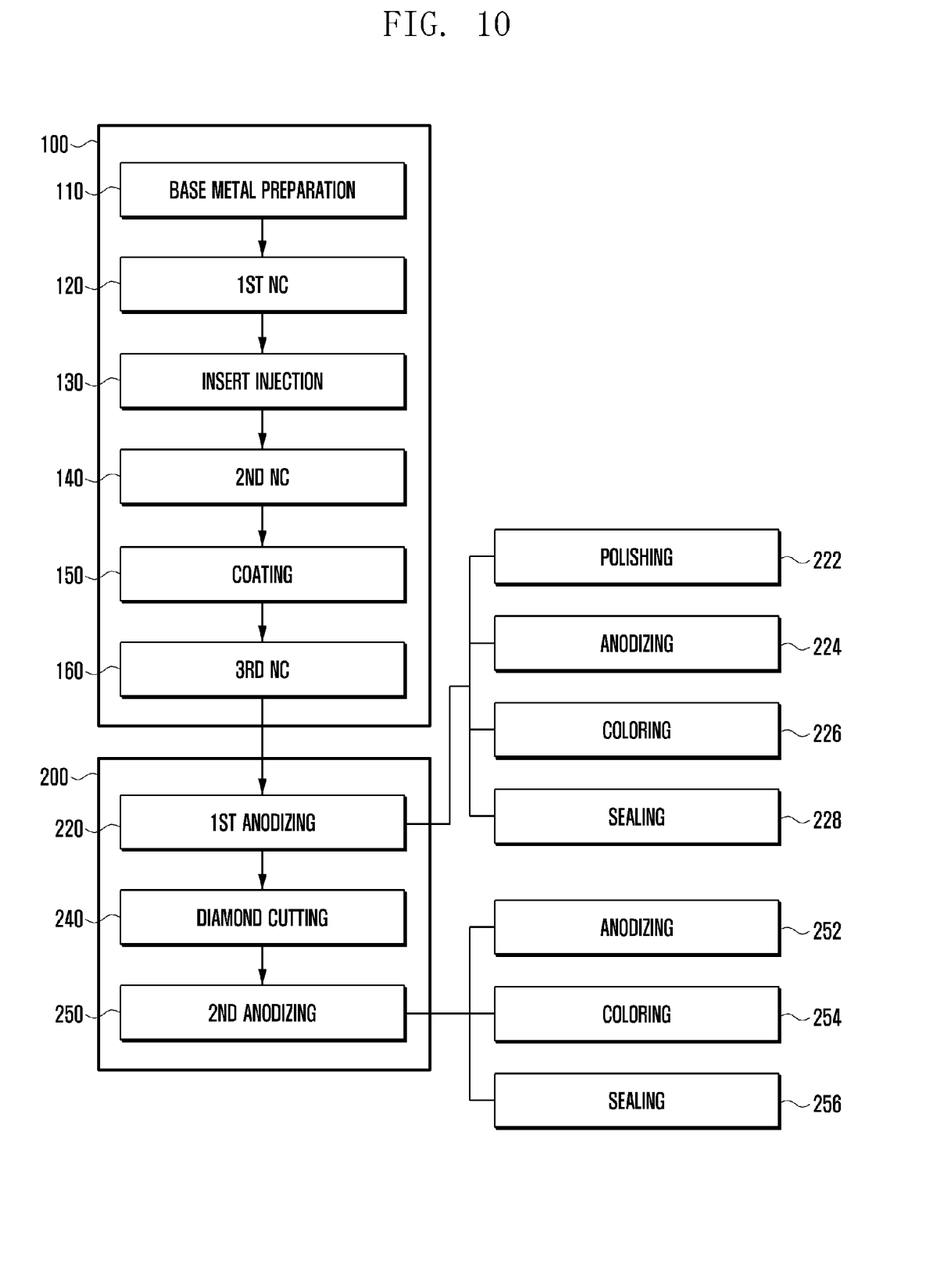
FIG. 10 is a flow diagram illustrating a method for manufacturing a metal housing of an electronic device according to another embodiment of the present disclosure.

FIG. 10 is a flow diagram illustrating a method for manufacturing a metal housing of an electronic device according to another embodiment of the present disclosure.

Contrary to the above-discussed method in FIG. 1, the method shown in FIG. 10 does not include the masking film attaching operation 210 and the masking film releasing operation 230 before and after the first anodizing operation 220.

For this, a non-metallic material used as a coating material for the coating operation 150 has a heat-resistant and acid-resistant ingredient which at least partially prevents oxygen or water penetration into micro dimples formed in a repeated pattern on the lateral face 44 of the external housing 10 and is thereby unaffected by anodizing. Therefore, the first anodizing operation 220 can be performed directly without requiring the masking film 60.

According to various embodiments of this disclosure, the method for manufacturing the electronic device having the metal housing can include a forming operation 100 for an external housing 10, and a lateral processing operation 200 for the external housing 10.

The forming operation 100 for the external housing 10 can include a base metal preparation operation 110 for preparing a base metal 1 of the external housing 10, a first processing operation 120 performed with respect to the prepared base metal 1 of the external housing 10, an insert injection operation 130 for attaching an injection part 30 to the first-processed base metal 1, a second processing operation 140 for forming an outward part 42 of the external housing 10 with respect to the base metal 1 having the injection part 30, a coating operation 150 for coating a non-metallic material on a surface of the base metal 1 having the outward part 42, and a third processing operation 160 for forming a lateral face 44 of the external housing 10 by removing a peripheral part of the base metal 1 from the outward part 42.

The lateral processing operation 200 for the external housing 10 can include an anodizing operation 220 for forming an anodized surface 70 on the lateral side 44 of the external housing 10, and a diamond cutting operation 240 for forming a diamond-cut face 72 with respect to a boundary between the anodized surface 70 and the coated surface 50 of the external housing 10.

Each of the first, second and third processing operations 120, 140 and 160 can be a numerical control (NC) processing.

The lateral processing operation 200 for the external housing 10 can further include an operation 210 of attaching a masking film 60 before the anodizing operation 220, and an operation 230 of releasing the masking film 60 after the anodizing operation 220.

The coated non-metallic material can have a heat-resistant and acid-resistant ingredient which at least partially prevents oxygen or water penetration into micro dimples formed in a repeated pattern on the lateral face 44 of the external housing 10 and is thereby unaffected by anodizing.

The anodizing operation can include an electroless polishing 222 performed on the lateral face 44 of the external housing 10, a first anodizing processing 224, a coloring 226 performed on micro dimples formed in a repeated pattern on the lateral face 44, and a sealing 228 of the colored micro dimples.

The polishing 222 can be adjusted in temperature and time to determine texture and gloss of the anodized surface 70, and the lateral processing operation 200 for the external housing can further include a second anodizing operation 250 with respect to the anodized surface 70 after the diamond cutting operation 240.

The second anodizing operation 250 can include an anodizing processing 252 performed on the anodized surface 70 after the diamond cutting operation 240, a coloring 254 performed on micro dimples formed in a repeated pattern on the lateral face 44, and a sealing 256 of the colored micro dimples.

According to various embodiments, it is possible to improve an outward appearance of the electronic device by realizing two colored textures of the metal housing through coating on the rear face and anodizing on the lateral face.

According to various embodiments, by coating the rear face of the metal housing with a material having a heat-resistant and acid-resistant ingredient, no change can be caused in color, quality, or texture even in an anodizing processing. Additionally, the heat-resistant and acid-resistant material is further coated on a boundary between the metal part and the injection part on the rear face, thereby securing the uniformity of both parts and effectively realizing various colors and textures without requiring any masking process.

As fully discussed hereinbefore, the electronic device including the metal housing according to various embodiments can improve an outward appearance with two colored textures by coating the rear face of the metal housing with a heat-resistant and acid-resistant material and also anodizing the lateral face. Further, by coating a boundary between the injection part and the metal part on the rear part of the metal housing, the electronic device can effectively secure the uniformity of the injection part and the metal part without using any additional member and any additional masking process.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. An electronic device comprising:
   an external housing including a first face facing a first direction, a second face facing a second direction which is the opposite direction of the first direction, and a lateral face at least partially surrounding a space formed between the first and second faces, wherein the lateral face couples the first face to the second face; and
   a display exposed through the first face of the external housing,
   wherein the external housing includes:
   a metal substrate having a first part at least partially forming the second face and a second part at least partially forming the lateral face, the second part being integrally extended from the first part; and
   a non-metallic material coated on the first part, and
   wherein the second part includes micro dimples having a repeated pattern on the lateral face, where the micro dimples are disposed on an exterior surface of the lateral face.

2. The electronic device of claim 1, wherein the metal substrate further has a third part extended between the first and second parts and exposed to outside.

3. The electronic device of claim 1, wherein the metal substrate further has a third part extended between the first and second parts, and the external housing further includes another non-metallic material coated on the third part of the metal substrate.

4. The electronic device of claim 1, wherein the first part has an injection part formed of a heat-resistant and acid-resistant material of engineering plastic by an insert injection.

5. The electronic device of claim 4, wherein the heat-resistant and acid-resistant material is Poly-Butylene-Terephtalate (PBT) or PolyPhenylene Sulfide (PPS).

6. The electronic device of claim 3, wherein the lateral face has an anodized surface formed by an anodizing process.

7. The electronic device of claim 6, wherein the micro dimples are formed in the repeated pattern on the anodized surface.

8. The electronic device of claim 1, wherein the non-metallic material coated on the first part has a heat-resistant and acid-resistant ingredient which at least partially prevents oxygen or water penetration into the micro dimples having the repeated pattern formed on the lateral face of the external housing and is thereby unaffected by anodizing.

9. The electronic device of claim 8, wherein the non-metallic material undergoes a curing reaction by a bake-type coating at a top coat, has adhesiveness between a middle color coat and a bottom primer coat and between the bottom primer coat and a putty, and uses primer material having adhesiveness with both metal material and PBT material containing 40% of glass fiber.

10. The electronic device of claim 6, wherein the anodized surface has a diameter of 20~30 nm and a depth or thickness of 3~6 μm.

11. The electronic device of claim 6, wherein the external housing further includes a diamond-cut face formed applying a diamond cutting process to a boundary between the anodized surface and the first part.

12. The electronic device of claim 11, wherein the micro dimples are formed in the repeated pattern on the anodized surface through a second anodizing process performed on the anodized surface after formation of the diamond-cut face.

* * * * *